E. A. FEHRING.
STOP AND TURN SIGNAL FOR VEHICLES.
APPLICATION FILED JUNE 14, 1920.

1,415,538.

Patented May 9, 1922.
4 SHEETS—SHEET 1.

Inventor
Emil A. Fehring

E. A. FEHRING.
STOP AND TURN SIGNAL FOR VEHICLES.
APPLICATION FILED JUNE 14, 1920.
1,415,538.
Patented May 9, 1922.
4 SHEETS—SHEET 2.
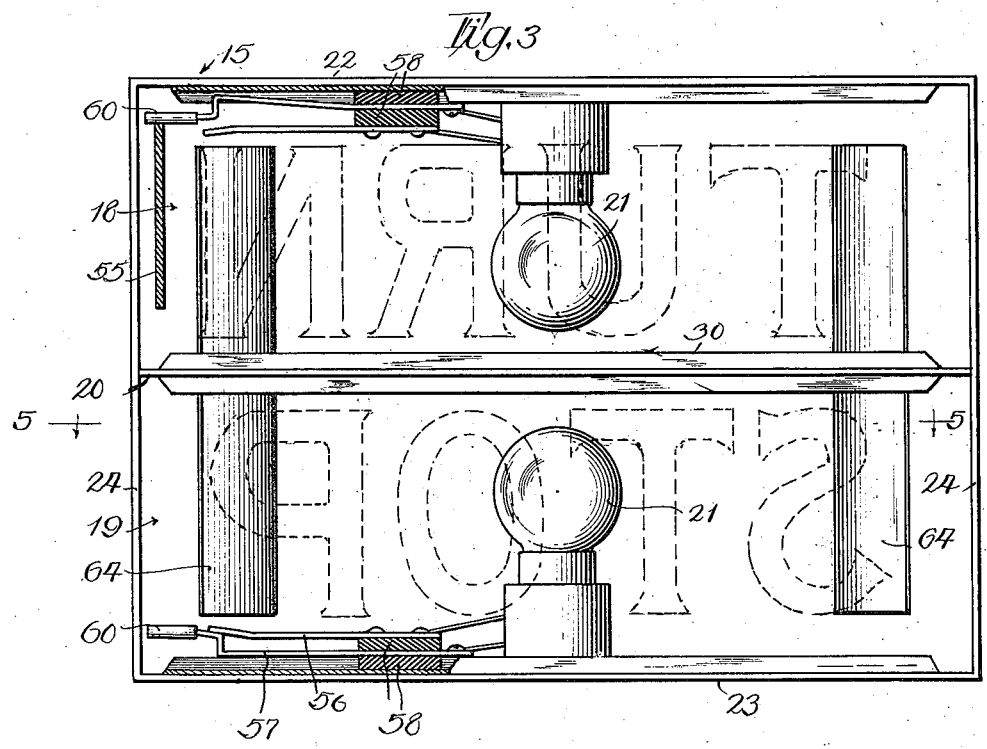
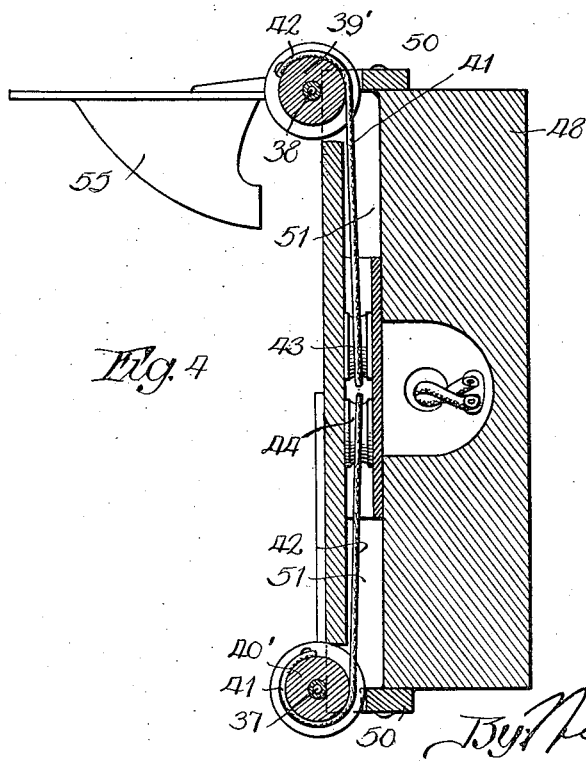

E. A. FEHRING.
STOP AND TURN SIGNAL FOR VEHICLES.
APPLICATION FILED JUNE 14, 1920.
1,415,538.
Patented May 9, 1922.
4 SHEETS—SHEET 3.
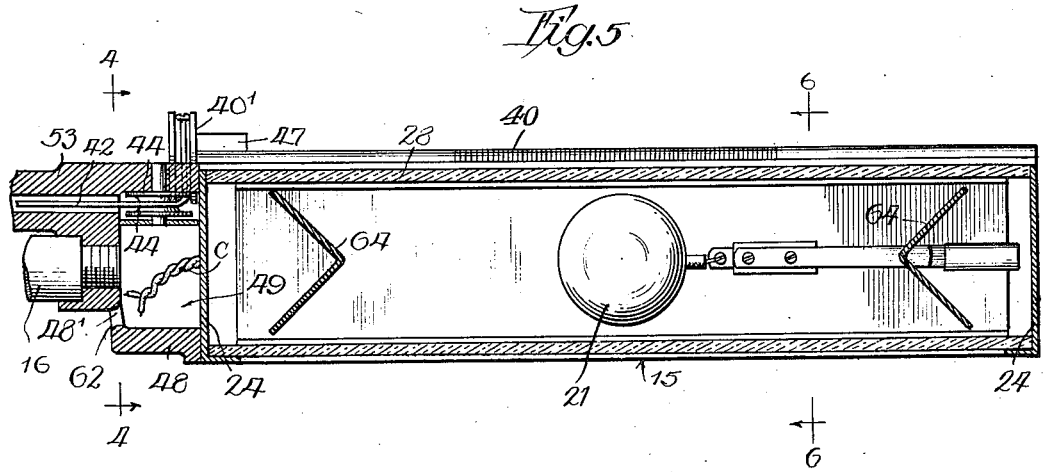
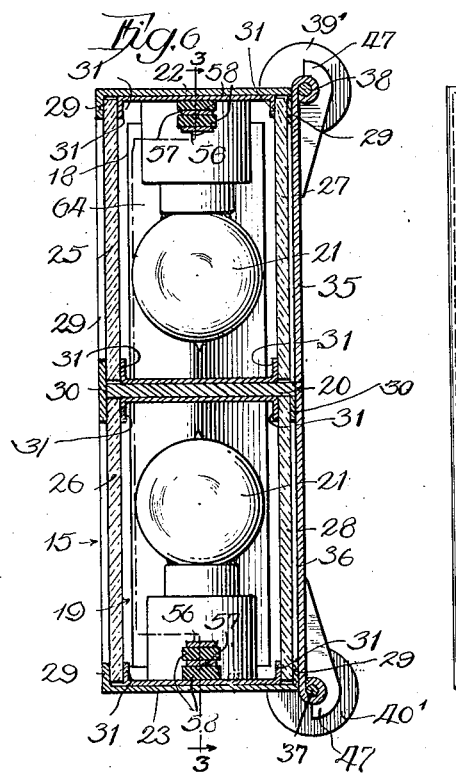
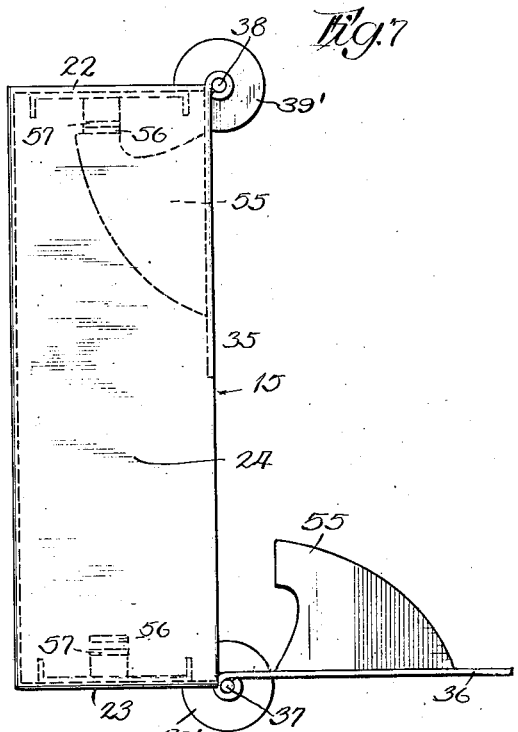
Inventor
Emil A. Fehring E. A. FEHRING.
STOP AND TURN SIGNAL FOR VEHICLES.
APPLICATION FILED JUNE 14, 1920.
1,415,538.
Patented May 9, 1922.
4 SHEETS—SHEET 4.
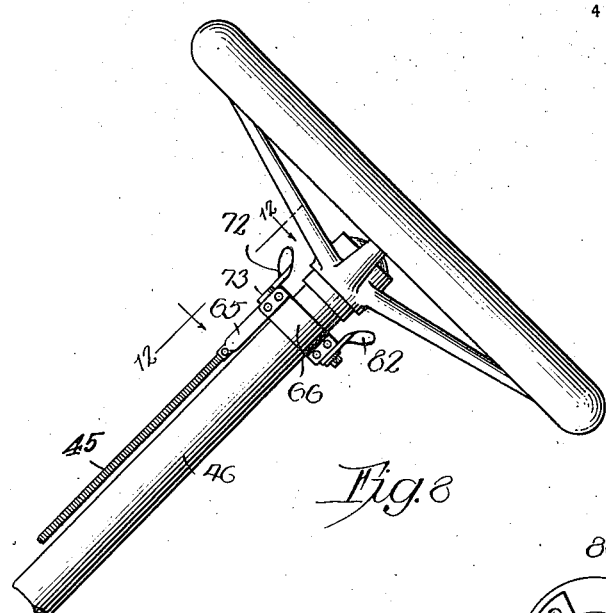
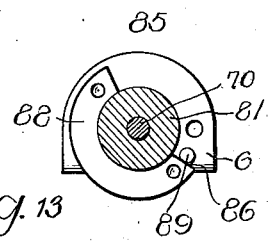
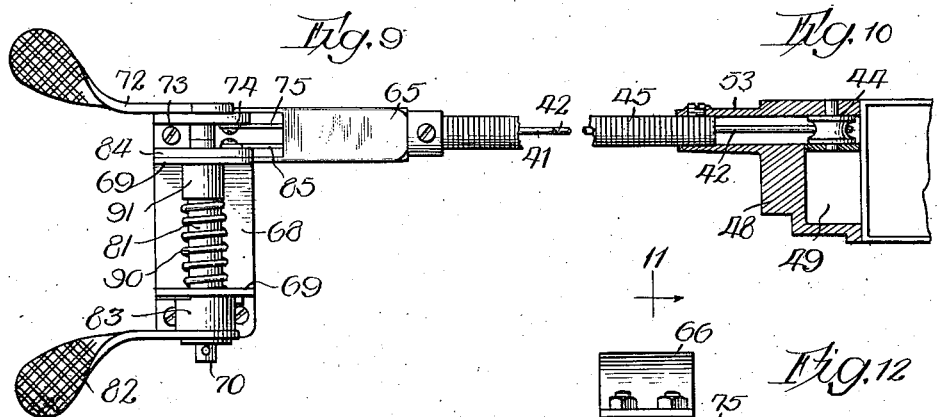
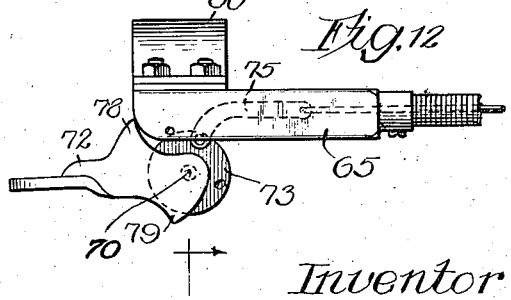
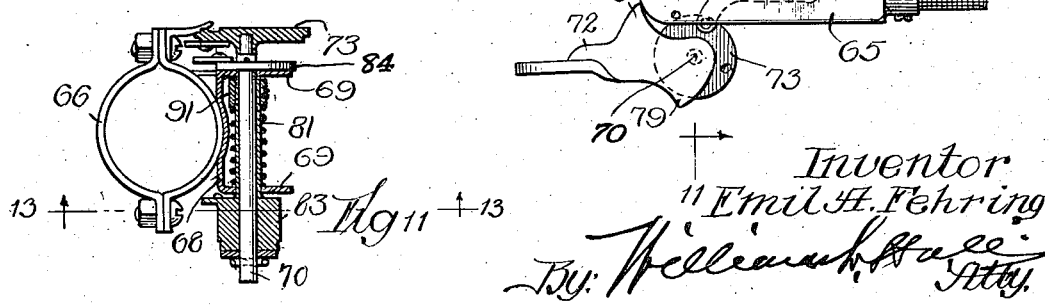

UNITED STATES PATENT OFFICE.

EMIL A. FEHRING, OF CHICAGO, ILLINOIS.

STOP AND TURN SIGNAL FOR VEHICLES.

1,415,538.  Specification of Letters Patent.  Patented May 9, 1922.

Application filed June 14, 1920. Serial No. 388,774.

*To all whom it may concern:*

Be it known that I, EMIL A. FEHRING, a citizen of the United States, and a resident of Chicago, in the county of Cook and State of Illinois, have invented certain new and useful Improvements in Stop and Turn Signals for Vehicles; and I do hereby declare that the following is a full, clear, and exact description thereof, reference being had to the accompanying drawings, and to the characters of reference marked thereon, which form a part of this specification.

This invention relates to signalling devices for vehicles of that class that is supported on a suitable part of the vehicle, preferably the wind shield post, and is so constructed as, when properly manipulated, to indicate to persons outside of the vehicle on which the device is used the contemplated movement of the car; that is to say, whether the driver proposes to stop or turn the car, and thus avoid collisions between cars and accidents to pedestrians.

Among the objects of the present invention is to provide a signal device of this general character, which, preferably, is supported on the wind shield post of the vehicle to extend laterally a distance therefrom, so that the signals of the device may be observed by persons both in rear and in front of the car, and to construct the device in such a way that a signal may be set so that it can be simultaneously read from both the rear and the front of the car both in daylight and at night time. For instance, as an example, if the vehicle be approaching a crossing, it is desirable that the traffic officer and pedestrians shall be apprised of the intentions of the driver of the car, whether he intends to merely stop to conform to traffic regulations or to turn to one side or the other, as well also as drivers of cars in rear. To this end the improved signal device herein shown is so constructed that a front and a rear signal may be thus simultaneously given.

Another object of the invention is to provide a signal device of this character, wherein the rear signals are normally covered by doors or other closures, and when employed in connection with electric lamps to construct the door or part movable with it in such a way that, when the door is closed, the lamp circuit is open, and when the door is open the lamp circuit is closed, so that a signal lamp may illuminate both the front and rear signals.

A further object of the invention is to provide improved means for operating the doors or like closures, constructed and arranged so that said doors or closures may be operated by devices conveniently located on the post of the steering wheel.

Other objects of the invention are to simplify and improve signal devices of this character, and the invention consists in the combination and arrangement of the parts shown in the drawings, described in the specification, and pointed out in the appended claims.

In the drawings—

Figure 3 is a section on the indirect line 3—3 of Figure 6.

Figure 4 is a section on the line 4—4 of Figure 5.

Figure 5 is a section on the line 5—5 of Figure 3.

Figure 6 is a section on the line 6—6 of Figure 5.

Figure 7 is an end view of the device, with one of the doors open.

Figure 8 illustrates the upper end of the steering post, showing the actuating means for the swinging doors or closures.

Figure 9 is a detail of the manual operating devices for the doors.

Figure 10 is a detail illustrating the means for guiding the operating strands that connect the steering post actuating devices with the swinging doors or closures.

Figure 11 is a section on the line 11—11 of Figure 12.

Figure 12 is a detail as seen from the indicating arrows on Figure 8.

Figure 13 is a section on the line 13—13 of Figure 9.

Figure 1:
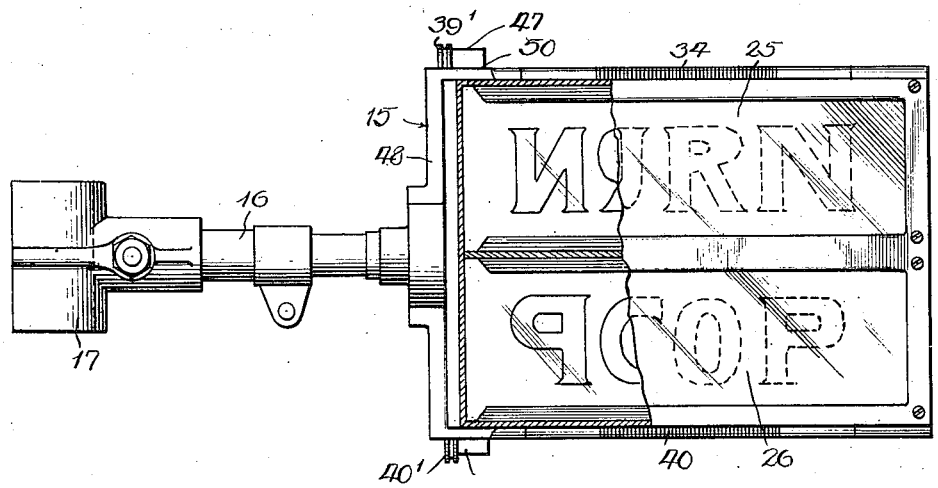
Figure 1 is a front view of a signal device embodying my invention.
Figure 2:
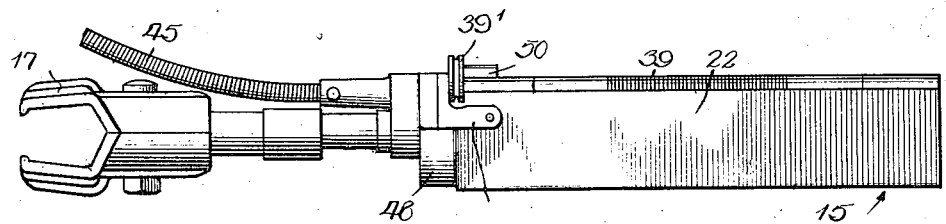
Figure 2 is a top plan view thereof.

A signal device embodying my invention embraces, in general terms, a box or casing, preferably a flat rectangle, designated in the several figures by 15, a telescopic shank 16 fitted at its inner end with a clamp 17 by which the device may be conveniently attached to the wind shield frame post. As herein shown, the casing is formed with upper and lower compartments or chambers designated as a whole by 18 and 19 that are separated from each other by a solid or opaque partition 20, and in each of these chambers is located an illuminating lamp 21, preferably an electric lamp. Each chamber has a front and a rear lens, as will be hereinafter described, on which is inscribed the signal data, so that a single lamp will separately illuminate both front and rear signals of a compartment.

The casing itself may be fabricated in any suitable way and is preferably made largely of sheet metal, having a top wall 22, a bottom wall 23, and end walls 24. The front and rear walls of the casing embrace lens carrying frames and comprise transparent, preferably glass, lenses constituting the larger parts of the said walls, each compartment of the casing being bounded by front and rear lenses, and containing a source of light to simultaneously illuminate them. The front lenses are designated by 25 and 26 and the rear lenses are designated by 27 and 28. The lenses are held in place by being confined at their margins between rim flanges 29 formed integral with the casing walls and front and rear cross members 30, and other rim flanges 31 formed on liner plates for the top and bottom walls and the compartment separating partition 20. The construction shown constitutes one convenient means of assembling the metal and glass members of the frame, and so far as these features of the construction are concerned may, within the broader phase of the invention, be otherwise arranged.

The front lenses are immovably fixed in place in the rim frames shown or by analogous construction. On the inner faces of these lenses are printed or traced the proper signal indicia, as the words "Turn" and "Stop" shown in Figure 3, the characters being of a tint not readily distinguishable when looking at the device from the front at a time when the lamps 21 are not illuminated or when natural light rays do not pass therethrough, so that no signal will show in the front unless intentionally shown by the driver of the vehicle. That is to say, the outline of the words or characters on said front lenses 25, 26 shall be such relatively to the character of the lens medium as not to be readily read by a person standing in front of the vehicle when the device is not illuminated by artificial or natural light but which will stand out to be readily seen from the front when the lamp associated with a given lens is so illuminated.

Printed or otherwise impressed on the rear lenses 27, 28 are words or other signal characters which correspond in kind and position to the words or characters traced on the front lenses. That is to say, if the upper lens 25 at the front of the device bears the word "Turn" the upper lens 27 at the back of the device will bear the same word, and of a tint to be clearly differentiated. Likewise the lower rear lens 28 will bear a word or character corresponding to the more faintly traced character of the lower front lens 26 and preferably of a tint to be clearly differentiated from the word or insignia of the other rear lens. For instance, in practice, the upper rear lens may bear the proper signal insignia, as of a green tint, while the lower lens may bear its proper signal insignia, as of a red tint; both sets of front and rear letters or characters being shown when the box or case is illuminated.

The rear lenses 27, 28 are normally concealed by hinged doors 35, 36 which are mounted to swing about pintles or rods 37, 38 that are fixed in any suitable manner in the lower and upper rear sides of the frame, so that each door is free to independently swing outwardly to expose the lens which it normally conceals. Said doors lie flat against the rim frames that confine the rear lenses, and are normally held in closed positions by spiral springs 39, 40 surrounding the pintles 37, 38 and suitably fixed thereto and to fixed parts of the doors in a familiar manner.

Fixed to corresponding ends of said pintles 37, 38 are pulleys 39', 40' to which are fixed and about which are trained cables 41, 42 which latter are directed inwardly towards the transverse center of the frame and about guide pulleys 43, 44 and are thence carried away from the frame side by side through a flexible tube 45 that is directed to and fastened on the steering post 46 of the vehicle in a manner to be hereinafter described. Each strand is independently fixed at the steering post to its own actuating device so that the doors may be independently or simultaneously opened at will, to a position determined by stops 47 movable with the doors and adapted to engage with the fixed parts of the frame, the doors being closed by the springs 39, 40 when pulling stress on the cable is released.

At the end wall 24 of the casing nearest adjacent to the stem 16, as herein shown, is fixed a casting 48, to which the stem 16 is directly attached. It extends vertically from end to end of said latter end wall and is chambered at 49 in line with the stem 16 to afford an outlet for the conductor cord C of the lamp circuit, the casting having an opening 48' for egress of said conductors. Said casting is fixed to the casing by upper and lower lugs 50 overlapping the upper and lower walls and screwed or riveted thereto. Within said casting 48 and near the center thereof are mounted the guide pulleys 43, 44 for the door operating cables, the casting having oppositely extending ways 51, through which extend the operating cables from the pulleys 39', 40' to said guide pulleys. Said casting has a hollow lateral extension 53 (Figure 5) parallel to the stem 16 for the passage of the door opening cables, and it receives at its inner end the outer end of the cable enclosing flexible tube 45.

Associated with each lamp 21 in each compartment is a switch device which is included in the lamp circuit and is adapted to be actuated to open said circuit when the corresponding door is closed, as by means of a rigid arm 55 at one end of the door and extending normally from the plane thereof. The switch device herein shown is of that type embracing two contact blades 56, 57 (Figures 3 and 6) connected to the wires of the conductor cord C. They are mounted upon, and insulated from each other by, suitable insulating blocks 58. The said contact blades 57, 56, or at least one of them, are resilient so that they tend to close one on the other to close the lamp circuit, and one of the contact blades of each pair is provided in the path of movement of the switch actuating arm 55 of the associated door with an extension 60, so located that when the door is closed, pressure on said blade 57 acts to separate the movable from the fixed blade and to thereby open the lamp circuit. Therefore, when both doors are closed, both lamp circuits are open and no signal will be illuminated. However, when one of the doors is opened, the corresponding lamp is illuminated through the closing of its switch by an arm 55, and by reason of the fact that the rays of the lamp are transmitted directly on both the front and rear lenses of the compartment in which the lamp is located, both the front and rear signal characters are illuminated, so that thereby the signal to be exhibited can be seen from the front, and can also be seen by the occupant of a rear car.

It will also be understood that when operating in the day time the circuit to the lamps may be opened by a suitably placed switch, and, in this event, the illumination for the signals will be the natural daylight illumination. By reason of the fact that when the doors are closed to cover or conceal the rear lenses the box or case will be darkened, and with a darkened back-ground, due to the closing of the box from the rear, the front signals will not show. Thus when in use in the natural light said front signals will not function normally, but the opening of the swinging doors will permit the natural light to pass through and into the box so as to illuminate the front signals as well as to disclose the rear signals; and only the front signal will thus be brought out that is intentionally displayed, or that opposite the door which has been opened. In other words, the characters of the rear lens are legible both by through and reflected illumination of said lenses, while the characters of the front lens are legible only by through illumination of said front lens.

In order that the rays emitted from the lamps may be diffused within the casing between the lenses, suitable upright reflectors 64, 64 are arranged between the lamps and the ends of the casing. The reflecting faces of these reflectors, as herein shown, are oblique to the planes of the lenses and constitute two sides of a triangular prism, relatively oblique reflecting faces thereof bearing such relation to the front and rear lenses and lamps as to diffuse the light uniformly over the lenses and uniformly illuminate the signal characters.

The flexible tube or casing 45 through which the door actuating cables 41, 42 are led to the actuating devices at the steering post, is connected at its outer end to a tubular fitting 65 (Figures 8, 9, and 12) that is fixed in any suitable manner, as by a clamp 66, to the steering post. Fixed to said clamp 66 is a bracket comprising a transverse base member 68 and outstanding lugs or ears 69, 69. Mounted to rotate in said lugs or ears is a short shaft 70, which extends outwardly beyond said lugs or ears. Fixed to one end of said shaft is an actuating arm 72, to the inner end of which is fixed or made integral a crank disc 73, provided with an eccentric pin or stud 74, to which is pivotally connected a link 75 that is attached at its outer end to one of the door opening cables. The said arm 72 is provided with limiting stops 78, 79 (Figure 12,) one of which is adapted to engage the end of the fitting 65 to limit the swing of the lever when it is moved into position to release the door operating strands to permit the door to close under the action of its closing spring and the other of which is adapted, in the reverse movement of the arm 72, to likewise engage said fitting to limit its throw at the limit of the opening movement of the door.

On said shaft 70 is rockingly mounted a sleeve 81, to which is fixed a second actuating arm 82 that is provided with a hub 83 which is fixed in any suitable manner to said sleeve 81 to rock the latter. Fixed to said shaft on the end thereof remote from the lever 82 is a crank disc 84 to which is connected by an eccentric stud a link 85 that is connected to the operating cable for the other door. The arm or lever 82 is arrested at the limits of its throw by stops 85, 86 (Figure 13) formed on a curved plate 88 that is fixed to said hub or sleeve 83, said stops cooperating with a fixed abutment 89 extending laterally from the outer face of the lug or ear 69 of the bracket 68.

If desired, a spring brake action between the lugs or ears may be effected by a spring 90 surrounding the sleeves 81 and interposed between a shoulder 91 on the sleeve and one of said ears or lugs.

I claim as my invention:

1. A signal device comprising a casing interiorly unobstructed to fore and aft passage of light rays therethrough, and provided with a front, uncovered lens and with a rear lens, said lenses bearing corresponding signal characters, the characters of said rear lens being legible both by through and reflected illumination of said rear lens and the characters of said front lens being legible only by through illumination of said front lens, an opaque closure normally to cover said rear lens, and operating means for said closure.

2. A signal device comprising a casing interiorly unobstructed to fore and aft passage of light rays therethrough, and provided with a front, uncovered lens and with a rear lens, said lenses bearing corresponding signal characters, the characters of said rear lens being legible both by through and reflected illumination of said rear lens and the characters of said front lens being legible only by through illumination of said front lens, a source of artificial light within said casing between said lenses, an opaque closure normally to cover said rear lens, and operating means for said closure.

3. A signal device comprising a casing interiorly unobstructed to fore and aft passage of light rays therethrough, and provided with a front, uncovered lens and with a rear lens, said lenses bearing corresponding signal characters, the characters of said rear lens being legible both by through and reflected illumination of said rear lens and the characters of said front lens being legible only by through illumination of said front lens, means to illuminate said lenses from within the casing, an opaque door hinged to said casing along an edge of said rear lens and adapted when closed to cover the latter lens, and operating means for said door.

4. A signal device comprising a casing divided by an opaque partition into an upper and a lower compartment, each interiorly unobstructed to fore and aft passage of light rays therethrough, uncovered front lenses, and rear lenses bounding said compartments, the lenses of each said compartments bearing corresponding signal characters, with the characters of the lenses of one compartment different in kind from those of the lenses of the other compartment, the characters of said rear lenses being legible both by through and reflected illumination of said rear lenses and the characters of said front lenses being legible only by through illumination of said front lenses, a source of illumination for each said compartments, and separately operable doors for normally covering said rear lenses.

5. A signal device comprising a casing divided by an opaque partition into an upper and a lower compartment, each interiorly unobstructed to fore and aft passage of light rays therethrough, uncovered front lenses, and rear lenses bounding said compartments, the lenses of each said compartments bearing corresponding signal characters, with the characters of the lenses of one compartment different in kind from those of the lenses of the other compartment, the characters of said rear lenses being colorably distinguished and being legible both by through and reflected illumination of said rear lenses and the characters of said front lenses being legible only by through illumination of said front lenses, a source of illumination for each said compartments, and separately operable doors for normally covering said rear lenses.

6. A signal device comprising a casing interiorly unobstructed to fore and aft passage of light rays therethrough, and provided with a front, uncovered lens and with a rear lens, said lenses bearing corresponding signal characters, the characters of said rear lens being legible both by through and reflected illumination of said rear lens and the characters of said front lens being legible only by through illumination of said front lens, an artificial light for illuminating said casing between said lenses, a reflector in the casing to diffuse light rays over both said lenses, an opaque closure normally to cover said rear lens, and operating means for said closure.

7. A stop and turn signal for vehicles comprising a casing having a compartment, front and rear lenses bounding said compartment, said front lens being uncovered and lightly traced with signal characters, the rear lens being more heavily traced with characters corresponding to those in the front lens, a signal lamp to simultaneously illuminate said lenses, a spring closed door for normally covering the rear lens, a pulley fixed to said door, an operating cable fixed to and trained about said pulley, and away from the device to actuate the door to open it against its closing spring, and a flexible shaft adapted to extend from said device to the steering post of the vehicle, and provided at said steering post with an actuating member for connection to said door operating cable.

8. A stop and turn signal for vehicles comprising a casing having a compartment, front and rear lenses bounding said compartment, said front lens being uncovered and lightly traced with signal characters, the rear lens being more heavily traced with characters corresponding to those in the front lens, a signal lamp to simultaneously illuminate said lenses, a spring closed door for normally covering the rear lens, a pulley fixed to said door, an operating cable fixed to and trained about said pulley, and away from the device to actuate the door to open it against its closing spring, a flexible shaft adapted to extend from said device to the steering post of the vehicle, and provided at said steering post with an actuating member for connection to said door operating cable, and means cooperating with said member to lock it in the position which it occupies when the door is either opened or closed.

9. A stop and turn signal for vehicles comprising a casing having upper and lower compartments, front and rear lenses bounding said compartments, with a partition between the compartments, said front lenses being uncovered and lightly traced with signal characters, the rear lenses being more heavily traced with differentiating color characters corresponding to those in the front lenses, a single lamp in each compartment for separately illuminating corresponding lenses, separately opening doors for normally covering the rear lenses, and reflectors at the ends of the compartments configured to reflect and diffuse the light rays over the said front and rear lenses.

10. A stop and turn signal for vehicles comprising a casing having a front uncovered lens bearing dim signal characters and a rear lens bearing signal characters, an electric lamp in said casing, a closure normally to cover said rear lens, a spring means to normally close said door, cable means to open said door, stop means to arrest the opening movement of the door, and mirrors arranged in the case to reflect and diffuse the light rays over said lens.

In witness whereof I claim the foregoing as my invention, I hereunto append my signature this 10th day of June, 1920.

EMIL A. FEHRING.